United States Patent [19]

Williams

[11] Patent Number: 5,825,164
[45] Date of Patent: Oct. 20, 1998

[54] INDUCTANCE CONTROLLER WITH LOAD REGULATOR

[75] Inventor: Harold Richard Williams, Columbus, Ohio

[73] Assignee: ADB-Alnaco, Inc., Columbus, Ohio

[21] Appl. No.: 576,799

[22] Filed: Dec. 21, 1995

[51] Int. Cl.[6] .................................................. G05F 1/14
[52] U.S. Cl. ........................................... 323/255; 323/239
[58] Field of Search .................................... 364/480–483, 364/492; 361/33, 86, 90, 88; 335/2, 20, 155; 324/415, 416; 323/234, 212, 258, 340, 239

[56] References Cited

U.S. PATENT DOCUMENTS

| | | | |
|---|---|---|---|
| 3,743,921 | 7/1973 | Legg et al. .............................. | 323/258 |
| 4,965,508 | 10/1990 | Soan ....................................... | 323/258 |
| 5,315,533 | 5/1994 | Stich et al. ............................. | 364/480 |
| 5,581,173 | 12/1996 | Yalla et al. ............................. | 323/257 |

Primary Examiner—Shawn Riley

[57] ABSTRACT

A method for changing the inductance of a multiple-tap transformer in a circuit having a current regulator and the transformer, including the steps of comparing the current regulator's duty-cycle to a duty-cycle setpoint, increasing the turns ratio of the transformer when the duty-cycle is less than the setpoint. An apparatus for switching the taps of a multiple-tap transformer connected to a power supply and a load circuit, including a load regulator for generating a desired duty-cycle signal, and an inductance controller having a first reference signal generator, a comparator for comparing the reference signal to the desired duty-cycle, and relays connected to the transformer taps that are responsive to the comparator.

28 Claims, 9 Drawing Sheets

| INPUT | | |
|---|---|---|
| VOLTAGE | CONNECT | LINE ON |
| 200 | 8-7; 2-1 | 8,1 |
| 210 | 8-7; 4-3 | 8,3 |
| 230 | 8-7; 6-5 | 8,5 |
| 400 | 2-7 | 8,1 |
| 410 | 2-7 | 8,3 |
| 420 | 4-7 | 8,3 |
| 430 | 2-7 | 8,5 |
| 440 | 4-7 | 8,5 |
| 460 | 6-7 | 8,5 |

INDUCTANCE CONTROLLER WITH LOAD REGULATOR

FIELD OF THE INVENTION

This invention is directed to an inductance controller for controlling the power transmitted through a power transformer. More particularly, this invention is directed to a transformer tap selector with constant current regulator. Most particularly, this invention is directed to an inductance controller for selecting transformer taps operated in conjunction with a constant current controller to maximize the duty-cycle of an electrical switch supplying power to the transformer for use in airport power systems.

BACKGROUND OF THE INVENTION

Airport power systems, like many other airport systems are regulated by the Federal Aviation Authority (FAA). An FAA requirement of airport power systems, such as those designed to supply distributed power for runway lights at the furthest limits of airfields, is that they provide a constant load current. The current supplied must be 6.6, 5.2, 4.1, 3.4, or 2.8 amperes, depending on the application. The load can vary, depending, for example, on the number of lighting circuits turned on. Since the load varies, the voltage applied to the load circuit must also vary to maintain a constant current. Consequently, the power circuit includes automatic regulation of the load.

A power system may include a transformer for increasing the voltage of the power source, such as 480 or 240 volts, to a voltage that will provide the proper current to the load. To provide a changing load with a constant current, the voltage applied to the load circuit must be changed. This may be done by a current regulator that regulates current flow through the primary winding of the transformer, in which a sensor for sensing the current in the load circuit may be connected to a gate control circuit for controlling the duty-cycle of an electrical switch that controls the current flowing through the transformer primary.

When the load current is too high, the current regulator reduces the duty-cycle of the switch, thus reducing the applied current through the transformer primary windings, and lowering the voltage at the transformer secondary windings. This lowered secondary voltage results in lower current through the load circuit, which is connected across the secondary windings. Conversely, when the load current is too low, the duty-cycle of the switch is increased, thereby increasing the current through the primary windings, increasing the voltage at the secondary windings, and increasing the current through the load.

This method and apparatus for providing a regulated constant current power system have been used, but have certain disadvantages. First, it produces electronic noise, which may interfere with the noise-sensitive computer-based components that have been installed in various airports. Such components may be connected via signal lines extending throughout the airport using the same underground channels through which the power lines run. The proximity of power lines and signal lines over great distances makes equipment more susceptible to noisy power lines. Second, when power systems operate at less than full capacity (i.e., less than 100% duty-cycle), the operation of the electrical switch generates high frequency harmonics that propagate into the secondary load circuit and thus affect the noise-sensitive equipment. Third, power converting equipment for converting the constant current to 120 Volts AC, for example, may be installed on the load circuit. The interaction between the power converting equipment and current regulator may cause the load current in the power system to oscillate. Finally, variations in the loads that are attached to airport power systems, and changed brightness settings may cause the duty-cycle of the electrical switch to change significantly, thus causing the power factor to vary significantly and increasing power costs.

Accordingly, an apparatus and method for providing a high duty-cycle over a wide range of loads, and current regulator output would be desirable. Such a method and apparatus should be capable of working in combination with existing current regulator circuits.

An apparatus and method for varying the inductive load would provide these benefits. If the duty-cycle of the electrical switch is low for a given load through a given transformer, increasing the primary-to-secondary turns ratio (either by increasing the number of primary windings relative to the secondary windings, or by decreasing the secondary windings relative to the primary windings) will allow the duty-cycle of the electrical switch to be increased while holding the load current constant. Maintaining a high duty-cycle reduces the noise caused by low duty-cycle switching and increases the power factor and system stability.

Varying the transformer inductance by changing the transformer's effective windings can be achieved by using a multiple tap transformer having multiple primary windings, multiple secondary windings, or both, and by selectively switching a portion of these windings in and out of the circuit, as the load changes, to maintain a high duty-cycle. Accordingly, a method and apparatus for automatically switching additional transformer windings either into or out of the circuit as the load (and hence the duty-cycle) changes would be desirable.

Combining this inductance controller with a current regulator would provide the advantage of automatically correcting the duty-cycle once the windings of the transformer were automatically increased or decreased.

SUMMARY OF THE PRESENT INVENTION

According to a first embodiment of the invention, a method for changing the inductance of a multiple-tap transformer in a circuit having a current regulator and the transformer, including the steps of comparing the current regulator's duty-cycle to a duty-cycle setpoint and altering the turns ratio of the transformer when the duty-cycle varies from the setpoint.

According to a second embodiment of the invention, an apparatus for switching the taps of a multiple-tap transformer includes a load regulator for generating a desired duty-cycle signal and an inductance controller having a reference signal generator to generate a signal indicative of a reference duty-cycle, a comparator for comparing the desired duty-cycle signal to the reference duty-cycle signal and for generating a relay change signal as a result of that comparison, and relays, connected to the transformer taps, that are responsive to the relay change signal.

DETAILED DESCRIPTION OF THE PREFERRED EMBODIMENTS

The following definitions apply in this description:

Duty-cycle: the current that flows through an electrical switch expressed as a percentage of the maximum current through the switch when the switch is fully conducting, RESET: a hardware reset signal generated and applied to an electrical circuit on power-up to reset the circuitry to a known state, SYNC: a clock signal for clocking a circuit. In the particular embodiments shown herein, it has the same frequency as the airport power system.

Before explaining at least one embodiment of the invention in detail it is to be understood that the invention is not limited in its application to the details of construction and the arrangement of the components set forth in the following description or shown in the drawings. The invention is capable of other embodiments or of being practiced or carried out in various ways. Also, it is to be understood that the phraseology and terminology employed herein is for the purpose of description and should not be regarded as limiting.

Figure 1:
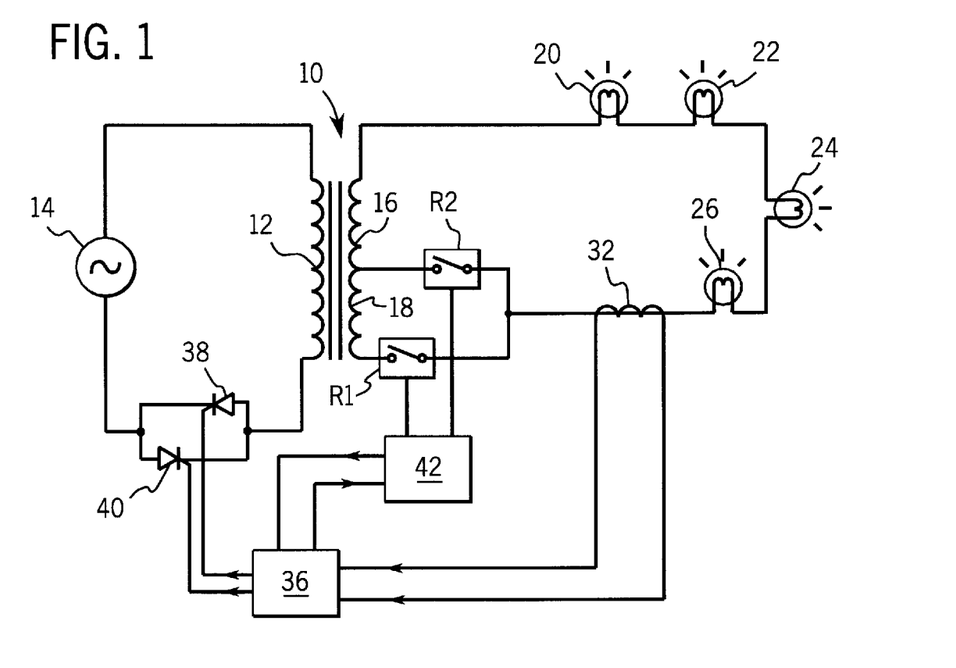
FIG. 1 is a schematic of an embodiment of an airport power regulator system in accordance with the current invention.

Referring now to FIG. 1, primary windings 12 of transformer 10 are connected to power supply 14. Power supply 14 represents the 240 or 480 volt AC power supplied to modern airports. Current from power supply 14 passes through primary windings 12 and is coupled into secondary windings 16, 18 of transformer 10. These secondary windings are connected in series with loads 20, 22, 24, 26, shown here as runway lights. Thus power from power supply 14 is reduced in voltage and supplied to loads 20–26.

In the FIG. 1 circuit, the load is maintained at a predetermined level using a current regulator that includes load sensor 32, electrical switch control circuit 36, and electrical switches 38, 40. The load is sensed by load sensor 32, here shown as a current transformer for measuring the load current. Electrical switch control circuit 36, responsive to the sensed load, varies the duty-cycle of electrical switches 38, 40 to maintain the target load parameter at the predetermined level. Depending on the target load parameter, whether current, voltage, or a combination of the two, electrical switch control circuit 36 turns on electrical switches 38, 40, for varying amounts of time during each half cycle of current flow to regulate current flow through the primary windings of transformer 10. Electrical switches 38,40 are either on or off, i.e. conducting or non-conducting. The switches are preferably solid state devices, such as silicon controlled rectifiers (SCRs), TRIACs, IGBTs, bipolar transistors, or other appropriate devices known to those skilled in the art.

Transformer inductance controller 42 automatically varies the effective turns ratio of the transformer as the load changes. In this embodiment, it senses changes in the load by receiving a signal representative of the requested duty-cycle from electrical switch control circuit 36. Alternatively, inductance controller 42 can receive a signal representative of the duty-cycle by monitoring a signal indicative of current flow through switches 38, 40. Transformer inductance controller 42 reduces the turns ratio by electrically adding secondary winding 18 (in series with secondary winding 16) into the circuit by closing relay R1 and opening relay R2. This increases the current flowing through load 20–26. In contrast, when the turns ratio is to be increased, the transformer inductance controller electrically removes secondary winding 18 from the secondary circuit by closing relay R2 and opening relay R1.

In an alternative embodiment, an inductance controller may electrically add or remove primary windings similarly so as to increase or decrease the turns ratio. In yet another embodiment, a combination of switchable primary and secondary windings could be employed to change the turns ratio.

Inductance controller 42 and electrical switch control circuit 36 may operate synergistically to optimize the duty-cycle in the following manner. When the load decreases, the switch control circuit 36 decreases the duty-cycle of switches 38, 40 to maintain a constant current through load 20, 22, 24, 26. Inductance controller 42 subsequently and automatically senses this decreased load (in this embodiment, by sensing the decreased duty-cycle) and electrically removes secondary winding 18 from the secondary side of the transformer. The increased turns ratio causes the voltage across the secondary and thus the current in the load to drop below an acceptable level. In response to this low current, the current regulator then automatically increases the duty-cycle to increase the current to an acceptable level. Thus, the current regulator and inductance controller work together to maintain the proper current through the load at a high duty-cycle.

At times, there are rapid small fluctuations in the duty-cycle of switches 38, 40 in an airport power system. Inductance controller 42 preferably does not change inductance with these rapid, small variations in the duty-cycle, but allows the duty-cycle to vary freely between an upper and a lower duty-cycle threshold before changing the transformer's inductance. Providing a band of acceptable duty-cycles reduces rapid switching and premature wear of the relays that switch transformer windings.

Figure 2A:
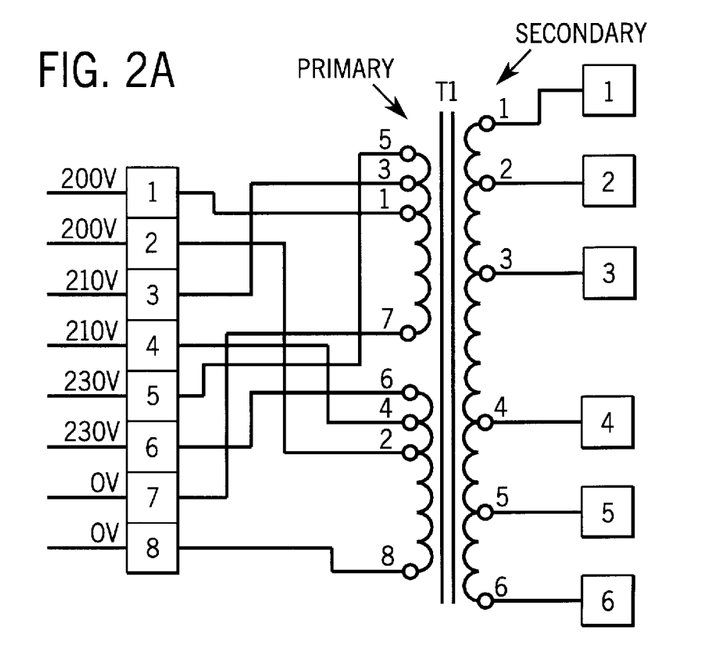
FIG. 2A is a schematic of a multiple tap transformer employed in the system.
Figure 2B:
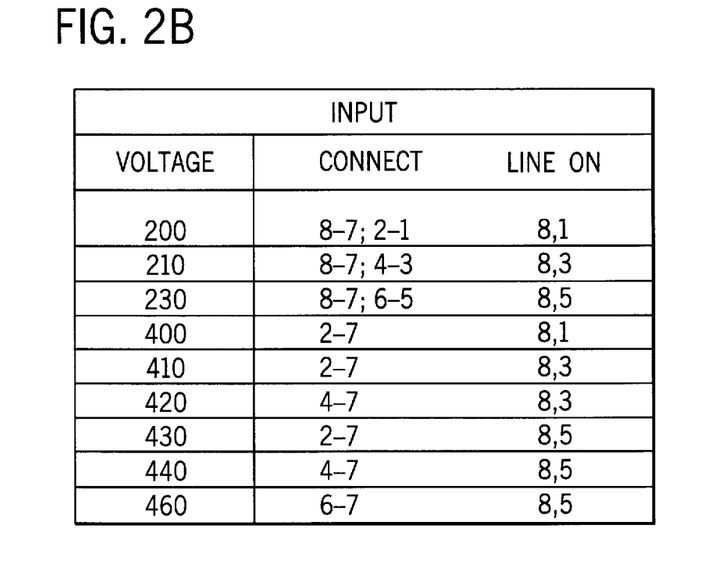
FIG. 2B is a table showing the primary tap connections for the FIG. 2A transformer.
Figure 2C:
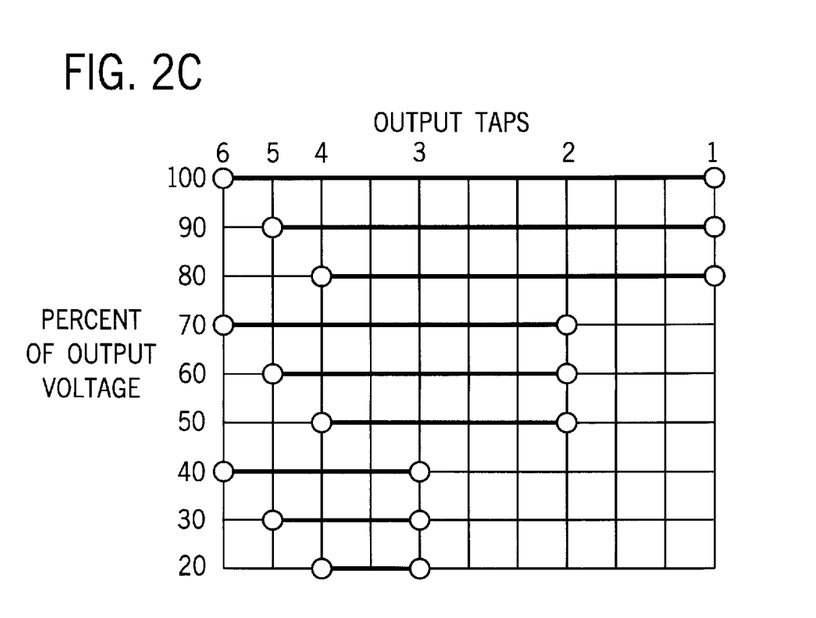
FIG. 2C is an illustration of power output versus secondary tap connections for the FIG. 2A transformer.

FIG. 2A shows a preferred transformer for use with an inductance controller according to the present invention. The secondary tap connections are changed under the control of the inductance controller. In this example, the transformer's primary taps are selected based on the voltage of the power supply to which the transformer primary is connected. FIG. 2B shows how the primary taps are jumpered ("CONNECT") and to which primary taps the power supply is connected ("LINE ON") for different power supply voltages ("VOLTAGE"). In the FIG. 2A example, the inductance controller electrically adds or removes secondary windings to change the transformer's inductance by connecting one side of the load to one of taps 1, 2, or 3, and the other side of the load to one of taps 4, 5, or 6. FIG. 2C illustrates the various secondary tap connections that must be made to achieve different turns ratios. With secondary taps 1 and 6 connected across the load, for example, the output voltage generated at the secondary and applied to the load is 100% of the maximum output voltage of the transformer. Similarly, when the transformer secondary is connected to the load via taps 1 and 5 (i.e. the secondary windings between taps 5 and 6 are electrically removed from the circuit) the output voltage generated at the secondary and applied to the load is 90% of the maximum output voltage. The chart further illustrates the load connections necessary for applying voltages equal to 80, 70, 60, 50, 40, 30, and 20% of the maximum voltage. The transformer shown here has 10% steps between taps. To maximize the duty-cycle, the steps are preferably no more that 25% apart, more preferably no more than 15% apart, and most preferably no more than 10% apart as shown in FIG. 2C.

Figure 3:
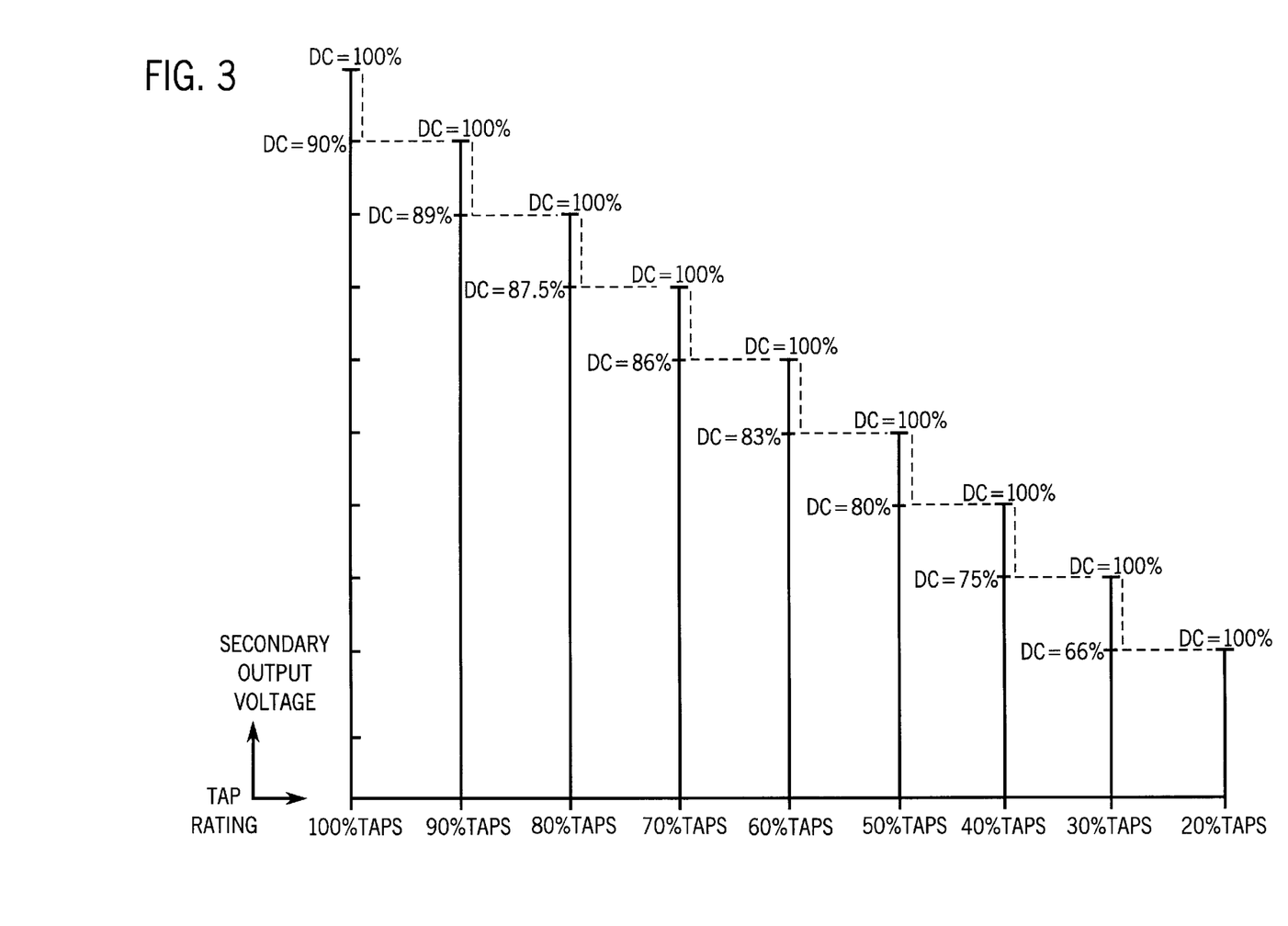
FIG. 3 illustrates the relation of electrical switch duty-cycle versus secondary voltage for the FIG. 2C secondary tap connections.

For each tap combination in FIG. 2C, and for every possible value of the duty-cycle, a particular output voltage is produced across the secondary windings. FIG. 3 illustrates this relationship. Each individual bar in FIG. 3 represents a graph of secondary output voltage versus electrical switch duty-cycle for each of the 9 different secondary tap combinations illustrated in FIG. 2. When the 20% taps are selected, for example, the output voltage varies between 0 and 20% of the maximum output voltage when the duty-cycle varies between 0% and 100% (DC=100). Similarly, when the 100% taps are selected, the output voltage varies between 0 and 100% as the duty-cycle varies between 0 and 100%.

The inductance controller preferably maximizes the duty-cycle for any given load. To do this, the inductance controller selects taps according to the dashed line shown descending in stair-step fashion in FIG. 3. The inductance controller changes from the 100% taps to the 90% taps when the duty-cycle reaches a lower duty-cycle threshold of about 90%. The 90% duty-cycle on the 100% taps corresponds to the highest output voltage possible when the load is connected across the 90% taps. Similarly, the inductance controller changes from the 90% taps to the 80% taps when the duty-cycle using the 90% taps reaches a lower duty-cycle threshold of about 89%. The 89% duty-cycle on the 90% taps corresponds to a 100% duty-cycle on the 80% taps. This pattern follows for the remaining taps as well, for example, the lower duty-cycle threshold for the 30% taps is 66%, equal to a 100% duty-cycle on the 20% taps. In general, to maximize the duty-cycle, the inductance controller changes the inductance to the next higher turns ratio when the output voltage at the currently selected set of taps is less than or equal to the 100% duty-cycle output voltage of the next higher turns ratio taps.

Figure 4:
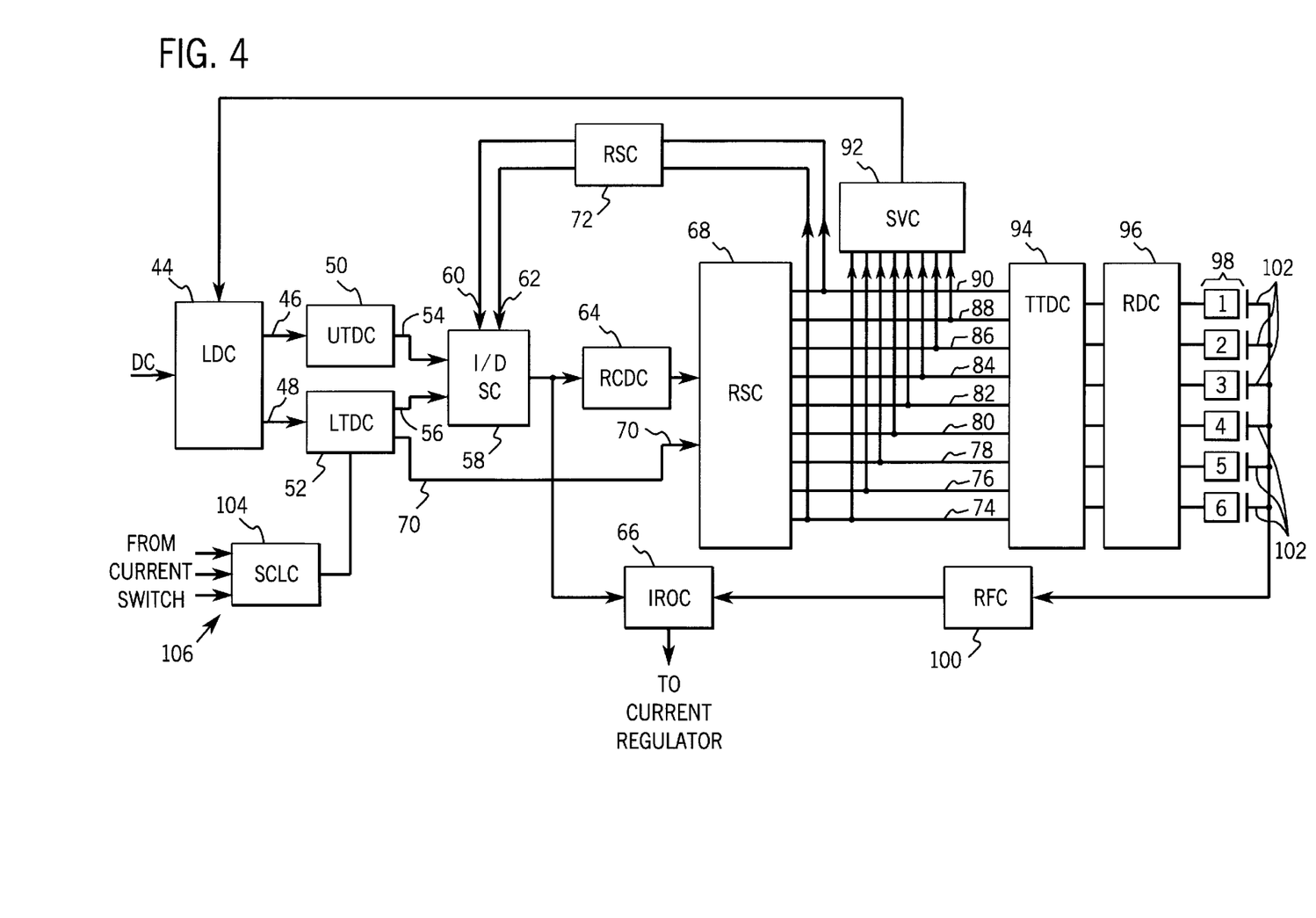
FIG. 4 is a block diagram of an inductance controller in the system.

FIG. 4 illustrates one embodiment of an inductance controller and transformer tap selection relays in accordance with the present invention. This inductance controller changes the inductance of the transformer of FIGS. 2A–C, by electrically adding or removing secondary windings. The windings are electrically added or removed by selectively energizing relays connecting the secondary windings to the load circuit. The inductance controller receives a duty-cycle ("DC") signal representative of the duty-cycle of the electrical switches (38, 40 in FIG. 1) from the current regulator.

The inductance controller has a level detection circuit 44 that compares the duty-cycle signal sent to electrical switches 38,40 with the upper and lower duty-cycle threshold signals. If the duty-cycle signal exceeds the upper duty-cycle threshold, an upper threshold exceeded signal is produced on line 46. If the duty-cycle is below the lower duty-cycle threshold, a lower threshold exceeded signal is produced on line 48. The source of the upper and lower duty-cycle threshold signals will be detailed below.

The inductance controller has an upper threshold delay circuit 50 and a lower threshold delay circuit 52 for determining, respectively, whether the upper and lower thresholds have been exceeded continuously for predetermined upper threshold and lower threshold delay times, respectively. These circuits prevent the relays from changing transformer taps until the respective thresholds have been exceeded continuously for the respective delay times. The preferred upper and lower threshold delay times are 2.1 sec. and 2.1 sec., respectively. The more preferred times are 0.6 sec. and 0.6 sec., respectively. The most preferred times are 0.3 sec. and 0.3 sec., respectively. When these circuits receive the threshold exceeded signals from the level detection circuit continuously for the entire delay period, they transmit tap change signals on lines 54, 56.

A tap increment/decrement suppression circuit 58 is provided that inhibits transmission of the tap change signals when the highest or lowest output transformer taps are already selected which will be discussed below. These signals are transmitted on lines 60–62, respectively.

The inductance controller further includes a relay change delay circuit 64 responsive to a tap change signal. This circuit delays the changing of transformer taps until the current regulator has shut off current flow through the electrical switches, thereby preventing the relay contacts from arcing when the taps are changed. When the tap change signal is received from tap increment/decrement suppression circuit 58, delay circuit 64 postpones transmitting the signal for a predetermined period of time, preferably for no more than 50 milliseconds, more preferably for no more than 30 milliseconds, and most preferably for about 20 milliseconds.

The regulator output is suppressed by the inhibit regulator output circuit 66 responsive to the tap change signal. This circuit switches off current flow through the electrical switches. In this embodiment, the inhibit circuit 58 signals the current regulator to shut off the switches (38, 40 in FIG. 1) by reducing the electrical switch duty-cycle to 0%. This circuit suppresses the regulator for a predetermined time period, preferably for no more than 5 cycles of the current, and more preferably for no more than two cycles of current. A longer suppression period increases the chance that devices in the load circuit will shut off or otherwise malfunction.

After being delayed in the relay change delay circuit, the tap change signal is sent to the relay selection circuit 68 which selects the particular output level of the transformer. The relay selection circuit 68 responds to the tap change signal to determine when a tap change should occur, and responds to a lower threshold exceeded signal (70) to determine which tap to select. The circuit generates signals indicative of one of the nine desired transformer output levels (i.e. 20%, 30%, . . . 100%) on the nine output lines 74–90.

If the taps currently selected are either the highest output taps or the lowest output taps, a rollover suppression circuit 72, responsive to a signal indicative of the currently selected taps, inhibits the inductance controller from incrementing the taps to the next higher output tap (when the highest output taps are already selected), and from decrementing the taps to the next lower output taps (when the lowest output taps are already selected). The circuit does this by signalling the increment/decrement suppression circuit 58 described above.

A setpoint voltage circuit 92, responsive to the currently selected taps, produces a setpoint voltage indicative of the lower duty-cycle threshold for the currently selected taps. This signal is transmitted to the level detection circuit 44 and is therein compared against the duty-cycle signal to determine whether the lower duty-cycle threshold has been exceeded.

The nine lines 74–90 indicating the desired transformer output level are decoded in a transformer tap decoder circuit 94 which generates signals indicative of the particular transformer tap relays to be energized. In this example, since there are six possible taps for the FIG. 2A transformer, relay signals are output on six lines. A relay driver circuit 96 receives these relay signals, amplifies them, buffers them, and drives each of the six relays 98 used in this embodiment.

In certain airport power systems, a brightness switch is provided for changing the load current setpoint of the current regulator circuit. The current regulator compares the load current setpoint against the actual secondary current sensed by the load sensors, increasing the duty-cycle if the actual current is less than the load current setpoint and vice versa. The brightness switch allows the operator to change the particular current to be maintained by the current regulator in the load. When the setpoint is changed, the change may trigger a sudden and momentary surge or drop in the load current and a corresponding surge or drop in the duty-cycle of the current regulator. After the load current has stabilized at the new output current level, some loads will continue to vary. These changes in load impedance may result from instability or a device that has cyclic operation, for example a strobe. To prevent any continued and unnecessary tap changes due to these continued duty-cycle surges, the FIG. 4 inductance controller provides a step change detection circuit 104 responsive to changes in the load current setpoint. When the setpoint is changed, a signal indicative of this change is received on lines 106. When this signal appears, this circuit enables the lower threshold delay circuit 52. The effect is to limit the time for a predetermined interval that tap changes can occur after the load current setpoint is changed.

A relay failure circuit 100 is also provided to shut off current flow through the electrical switches when a relay fails. A relay failure causes arcing across the contacts of the failed relay. This arcing produces high-frequency electromagnetic radiation that is sensed by conductors 100 disposed near each relay 98. When a relay fails, this radiation is transmitted, amplified and rectified in relay failure circuit 100, and is provided to the inhibit regulator output circuit 66 to immediately shut off the electrical switches.

Figure 5:
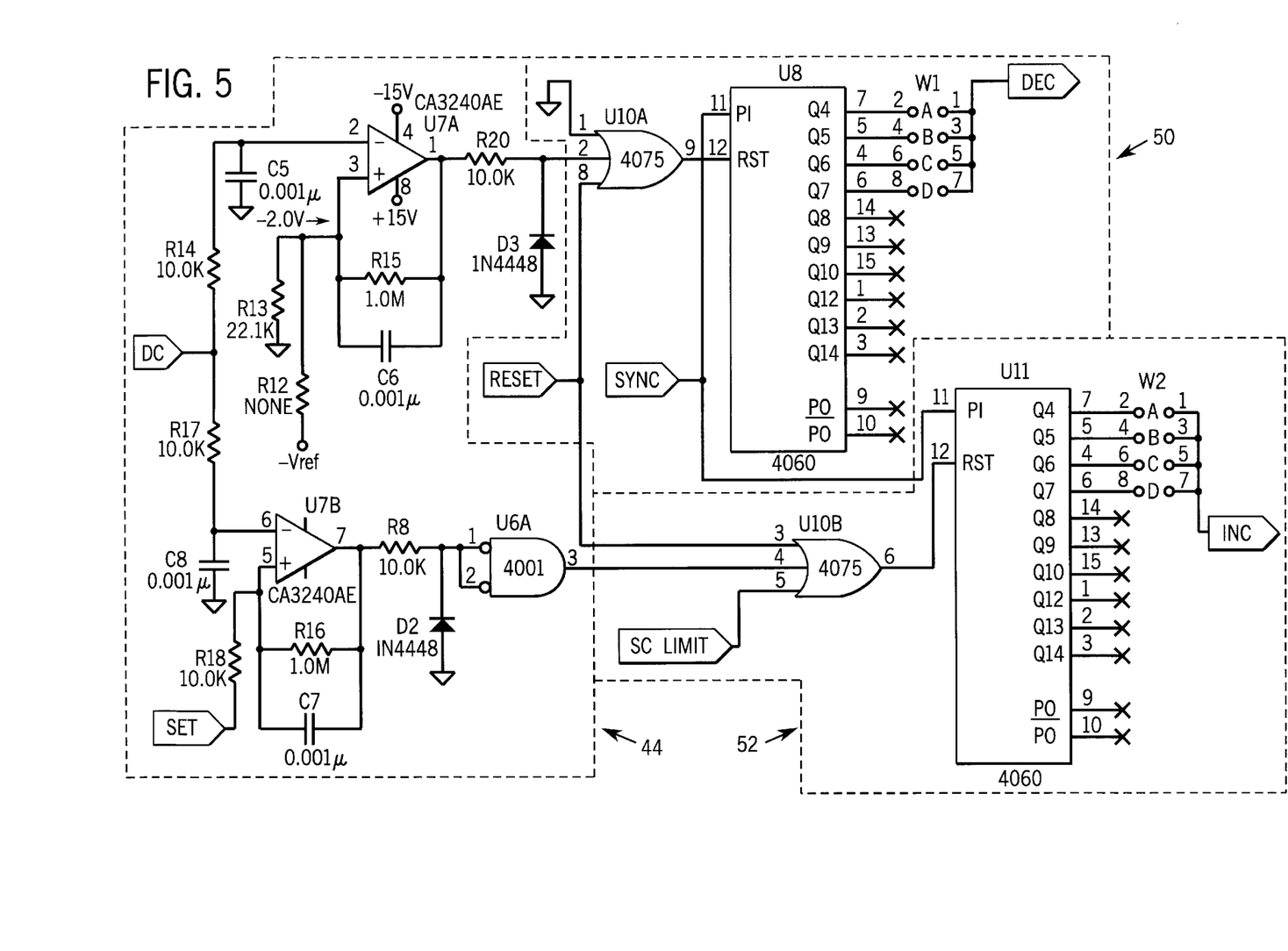
FIG. 5 is a schematic of the level detection circuit, the upper threshold delay circuit, and the lower threshold delay circuit of the FIG. 4 inductance controller.

FIG. 5 shows a schematic of one embodiment of level detection circuit 44, upper threshold delay circuit 50, and lower threshold delay circuit 52. Level detection circuit 44 receives the duty-cycle signal ("DC") from the current regulator, which varies between 0 and −7.7 volts in this embodiment. A zero volt signal corresponds to a duty-cycle of 100%, and a −7.7 volt signal corresponds to a duty-cycle of 0%. A duty-cycle signal greater that 0.0 volts indicates that the current regulator is attempting to increase the duty-cycle above 100%. This condition occurs when the current regulator is unable to maintain the load current with a 100% duty-cycle, and signals the inductance controller to switch the load to the next higher output taps. When comparator U7A detects a duty-cycle signal greater than 0 volts, its output goes low, signalling that the upper duty-cycle threshold has been exceeded. The lower comparator, U7B, compares the duty-cycle with the lower duty-cycle threshold signal, and the output of U6A goes low when the duty-cycle drops below this setpoint. Referring now to upper threshold delay circuit 50, gate U10A resets delay counter U8 when the output of U7A goes low, causing the counter to begin incrementing with each pulse from the system clock signal ("SYNC"). The counter continues counting only as long as the output of U7A is low, i.e. as long as the duty-cycle signal exceeds 0.0 volts. If the duty-cycle signal is less than 0.0 volts at any time during the count, timer U8 is reset by U10A, and begins counting from zero. The length of the delay is determined by jumper W1 on the output of U8. When timer U8 counts uninterrupted for the time period set by W1, relay decrement signal "DEC" goes high.

Regarding lower threshold delay circuit 52, timer U11 begins counting when the output of U6 goes low, i.e. when the duty-cycle signal is less than the lower duty-cycle threshold signal. Timer U11 continues counting for a predetermined delay period set by jumper W2 unless and until the duty-cycle signal is greater than the setpoint voltage, at which point U10B will reset timer U11. When timer U11 counts uninterrupted for the time period indicated by jumper W2, relay increment signal "INC" goes high.

The lower threshold delay timer U11 is also held in reset by step change time limit circuit 104, until "SC LIMIT" goes low due to a step change in the brightness setting of the lighting circuit.

Figure 6:
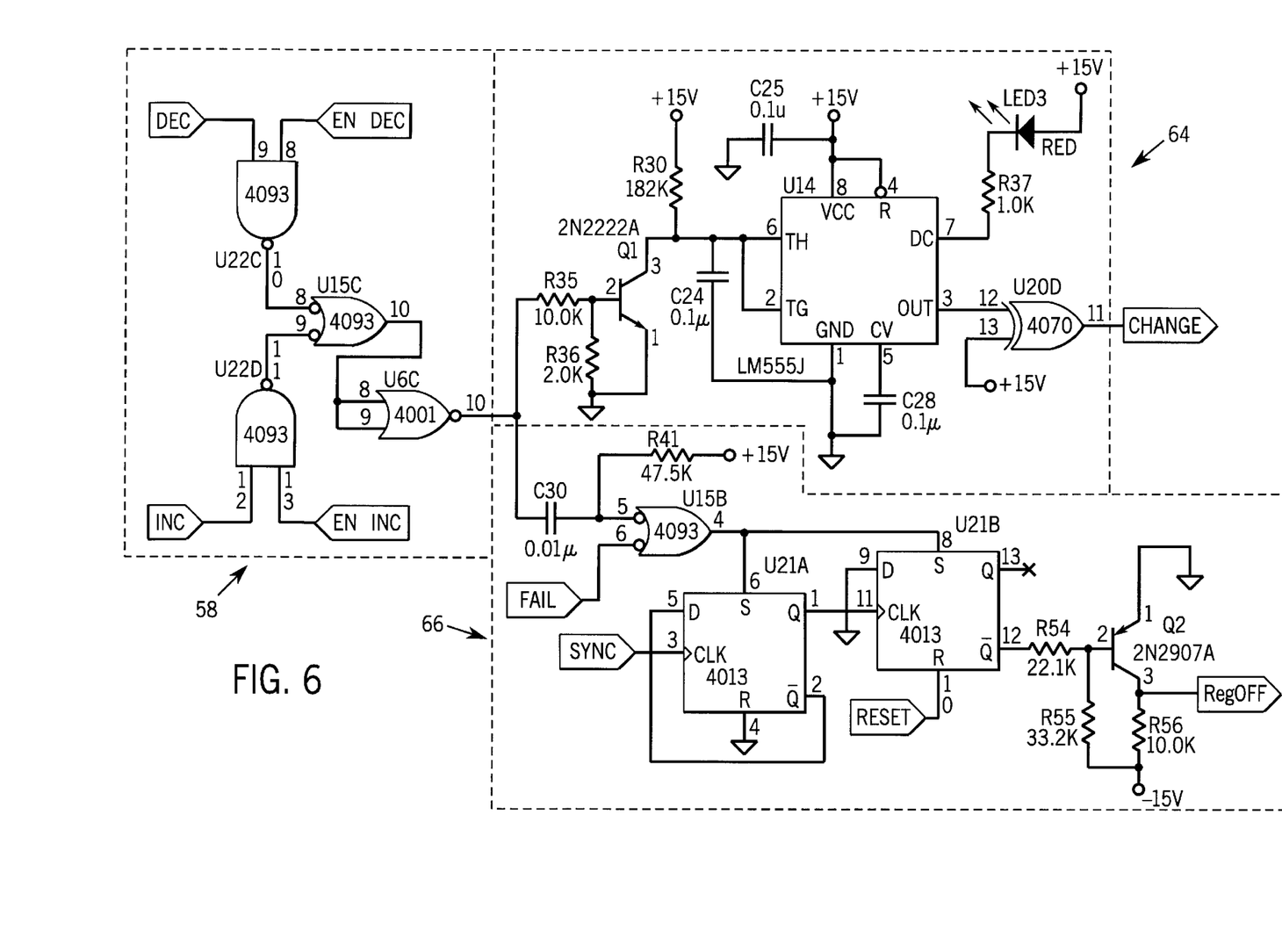
FIG. 6 is a schematic of the increment/decrement suppression circuit, relay change delay circuit and inhibit regulator output circuit of the FIG. 4 inductance controller.

Regarding FIG. 6, increment/decrement suppression circuit 58 receives the output of the upper ("DEC") and lower ("INC") threshold delay circuits, and passes them to the relay change delay circuit, as long as the enable decrement ("EN_DEC") and enable increment ("EN_INC") signals, respectively, are high. These signals are generated, respectively, when the transformer's highest or lowest output secondary taps are selected, and will be discussed in conjunction with FIG. 7. Both "INC" and "DEC" signals are combined into a common output in U15C, inverted in U6C, and are sent to relay change delay circuit 64 and inhibit regulator output circuit 66. The output of circuit 58 arrives at relay change delay circuit 64 and turns off transistor Q1, which starts timer U14. After 21 milliseconds the output marked "CHANGE" will go high. Thus the relay change delay circuit delays that tap change signal for a predetermined period until the primary current can be suppressed in the inhibit regulator output circuit 66.

The output of circuit 58 also generates a pulse that sets flip-flops U21A and U21B in inhibit regulator output circuit 66. A level shifter transistor Q2 then changes the output "RegOFF" from −15 volts to approximately zero volts. "RegOFF" signals the current regulators to output a 0% duty-cycle to the electrical switches. The flip-flops are clocked by "SYNC". The flip-flop U21B is clocked to the reset state by the divide-by-2 output from U21A pin 1 after a period of two cycles of the power supply voltage to the electrical switches (i.e. two cycles of "SYNC"), at which time the output "RegOFF" returns to −15 volts, and the current regulators are again enabled. The relay failure signal ("Fail") similarly generates the "Regoff" signal, which will be discussed below in conjunction with FIG. 8.

Figure 7:
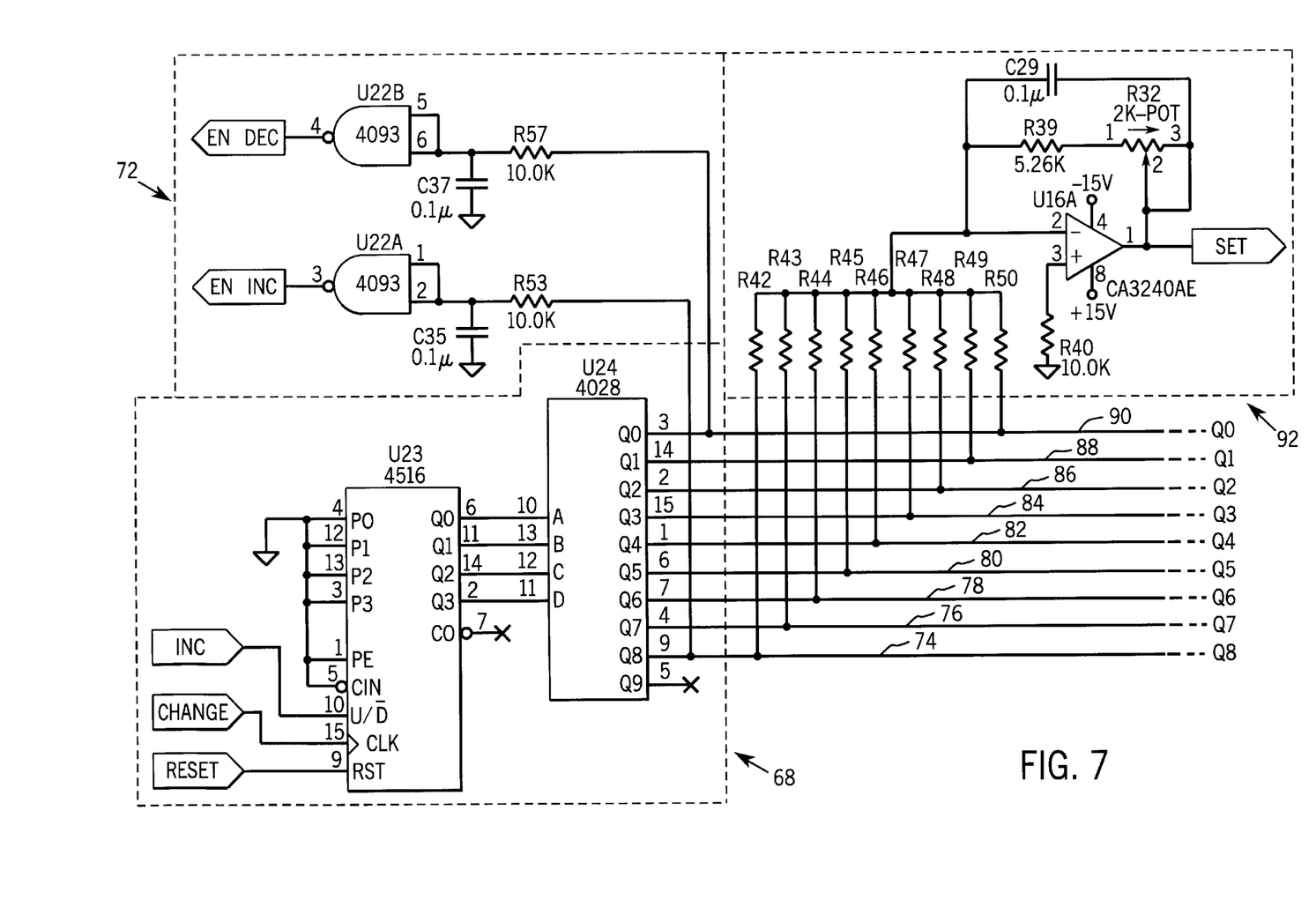
FIG. 7 is a schematic of the relay selection circuit, rollover suppression circuit, and setpoint voltage circuit of the FIG. 4 inductance controller.

Referring to FIG. 7, which illustrates relay selection circuit 68, rollover suppression circuit 72, and setpoint voltage circuit 92, U23 of relay selection circuit 68 receives the "CHANGE" signal from relay change delay circuit 64. "CHANGE" signals U23 to increment or decrement outputs Q0–Q3 depending on the value of "INC". The "INC" signal is received from the lower threshold delay circuit 52, is high if the lower threshold delay circuit triggered the "CHANGE" signal, and is low at all other times, specifically when the upper threshold delay signal triggered the "CHANGE" signal. Thus, when the upper duty-cycle threshold signal is exceeded, U24 is decremented, and the next higher output taps are selected, and vice versa. U23 outputs Q0–Q3 are decoded in U23, which drives only one U24 output Q0–Q8 high at a time, depending upon the value of U23 outputs Q0–Q3. Each of U24 outputs Q0–Q8 corresponds to one of the power output tap combinations shown in FIG. 2C.

Rollover suppression circuit 72 is provided to prevent all the output lines Q0–Q8 from being disconnected at once, which would totally disconnect all the transformer relays simultaneously. In particular, the signals on lines Q0 and Q8 corresponding to the tap selections for transformer voltage outputs of 100% and 20%, respectively, are sensed by rollover suppression circuit 72, which signals increment/decrement suppression circuit 58 via "EN_DEC", and "EN_INC" which inhibits relay increment and decrement signals from being transmitted to relay change delay circuit 64, and thus suppresses the "CHANGE" signal.

The lower duty-cycle threshold preferably varies depending on the currently selected taps to follow the optimum duty-cycle path shown in FIG. 3. Setpoint voltage circuit 92 is provided to vary the signal. This circuit senses outputs Q0–Q8 to determine which transformer taps are currently selected, and changes the lower threshold duty-cycle signal ("SET") to the appropriate level for the current taps, using resistors R42–R50 having resistances of 63.4K, 57.6K, 49.9K, 45.3K, 40.2K, 36.5K, 31.6K, 26.1K and 22.1K, respectively.

Figure 8:
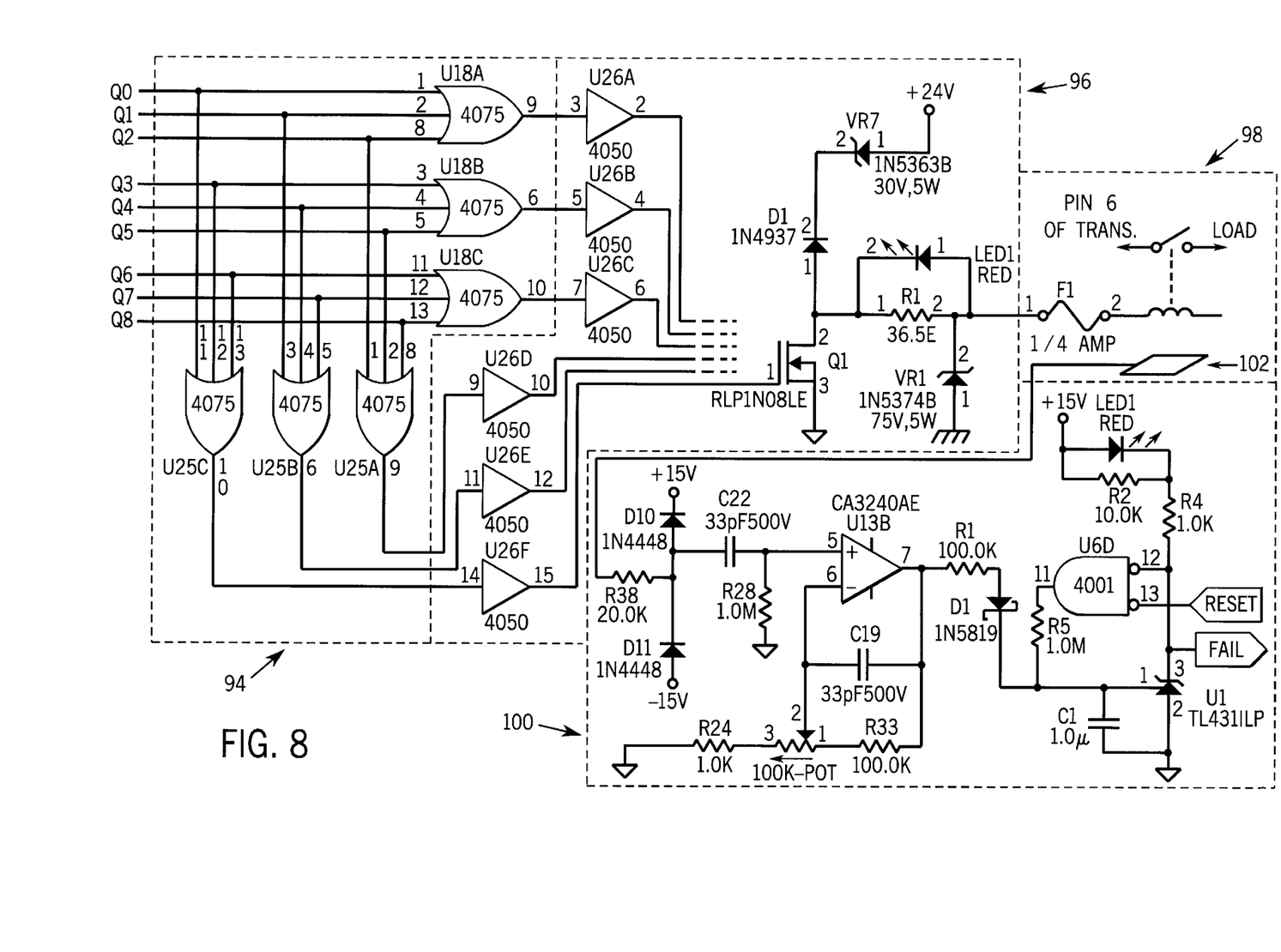
FIG. 8 is a schematic of the transformer tap decoder circuit, relay driver circuit and relay failure circuit of the FIG. 4 inductance controller.

Referring to FIG. 8, transformer tap decoder circuit 92 decodes the power level signals received on output lines Q0–Q8 from U24 in FIG. 7 to generate signals representative of the particular transformer tap relays to be energized.

Drivers U26A–U26F in relay driver circuit 94 amplify the decoder outputs and signal relays 98 to connect transformer taps 1–6, respectively, to the load circuit. In FIG. 8, only driver U26F is shown. The other five relays and their respective driver circuits that are connected to the outputs of U26A–E are the same, but are omitted for clarity.

Figure 9:
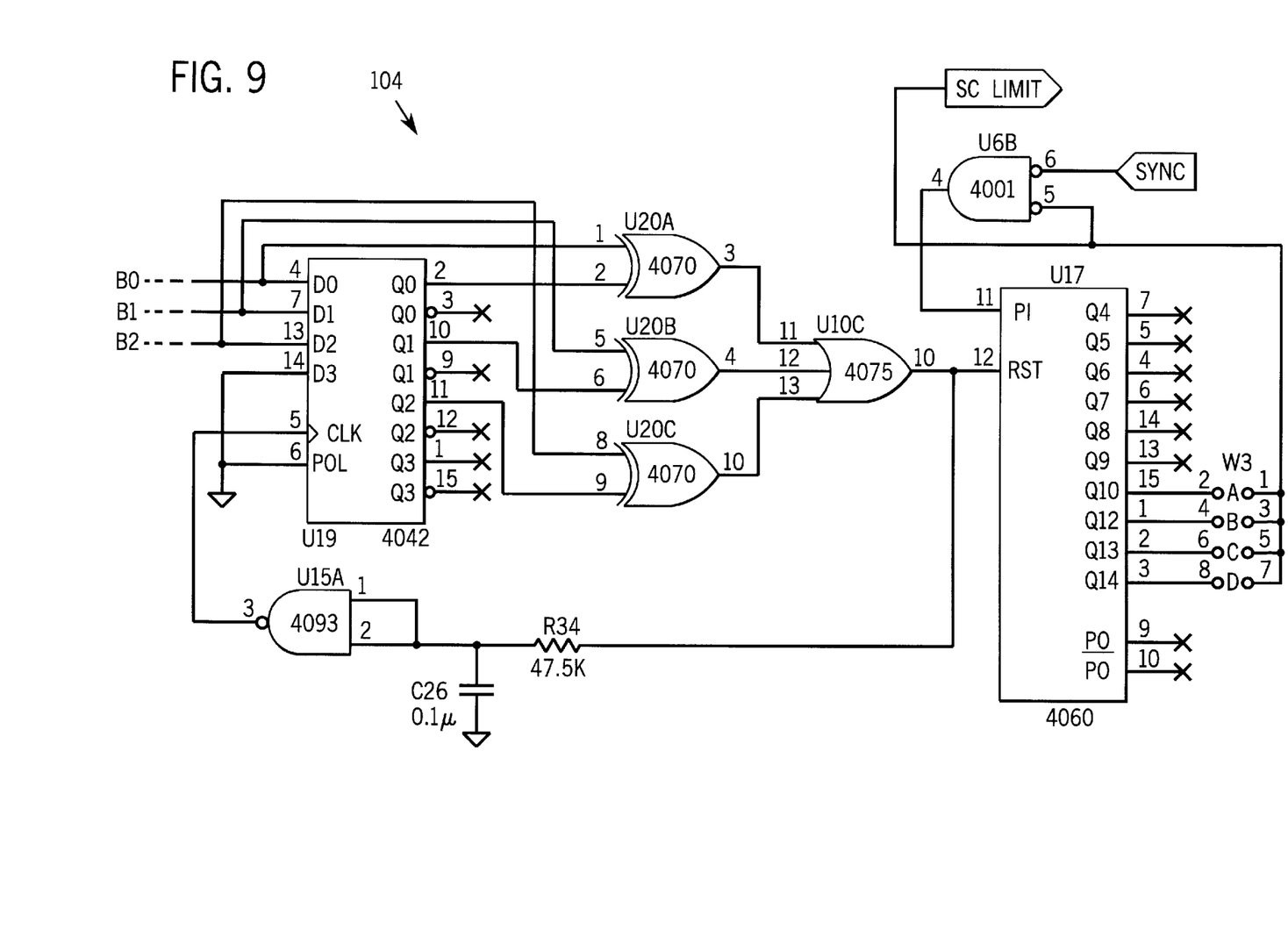
FIG. 9 is a schematic of the step change time limit circuit of the FIG. 4 inductance controller.

In FIG. 9, a detailed view of step change time limit circuit 104 is provided. This circuit allows the transformer tap relays to be changed for a predetermined period after a step change in brightness is made, for example by the operator operating the brightness switch. The brightness switch position is transmitted to the circuit on lines B0–B2. Any change in the brightness level is indicated on these lines as a change in digital signal levels on at least one of these lines B0–B2 and triggers a reset of U17, which immediately begins counting each "SYNC" pulse. In addition, output "SC LIMIT" immediately goes low, which enables the lower threshold exceeded signal (as shown in FIG. 5). This enabling of the lower threshold exceeded signal continues for the predetermined time period set by jumper W3. Once this time passes, "SC LIMIT" goes high again, holding the lower threshold delay circuit in reset, so if a lower threshold exceeded signal occurs again it will be ignored.

High-frequency antennas 102, embodied here as copper plates located in close proximity to relays 98, receive radio-frequency radiation from arcing contacts of any relay when it fails. This signal is transmitted to relay failure circuit 100 where it is clamped to the +15 volt to −15 volt range tolerated by the input of amplifier U13B. The signal passes through a high pass filter formed by capacitor C22 and resistor R28, and is then provided to amplifier U13B. The amplified signal then passes through diode D1 and pumps up capacitor C1. Once the charge on capacitor C1 reaches a predetermined threshold level, U1 turns on, and generates relay failure signal ("FAIL"), indicating that a relay has failed. This signal is latched "on" by gate U6D, and can only be reset by the start-up "RESET" signal. The FAIL signal, in turn, signals the inhibit regulator output circuit 66 (FIG. 6) to produce the "RegOFF" signal.

The main transformer shown in the embodiments described above is a multiple-tap transformer in which the turns ratio is variable by switching between the taps. This is the preferred embodiment. There are several main transformer arrangements that provide the same variable effective turns ratio capability that are operable in conjunction with the sensing and switching circuits described above. For example, an auto-transformer with multiple taps may be connected across the main transformer and the auto-transformer taps selected as described above to provide the correct effective turns ratio. Alternatively, a separate transformer may be connected in series with the main transformer having some of its turns "in phase" with the main transformer, or "out of phase" with the main transformer to either buck or boost the output of the main transformer, and thereby either increase or decrease the effective turns ratio of the main transformer. The turns of the separate transformer can be switched into or out of the circuit as described above.

I claim:

1. A method for changing the inductance of a multiple-tap transformer in a circuit having a current regulator and the transformer, comprising the steps of:

(a) comparing a first duty cycle of said current regulator with a first duty cycle setpoint and providing a first output signal which is in a first state when said first duty cycle is less than said first duty cycle setpoint and in a second state otherwise;

(b) monitoring said first output signal to produce a first tap change output signal when said first output signal has been in said first state for a first predetermined time interval; and (c) increasing the primary-to-secondary turns ratio of said transformer responsive to said first tap-change output signal.

2. The method of claim 1, further including the step of:

(d) increasing the duty cycle of said current regulator to a second duty cycle greater than said first duty cycle.

3. The method of claim 2, wherein the step of increasing the duty cycle includes the step of increasing the duty cycle to about 100%.

4. The method of claim 2, further comprising the steps of:

(e) comparing a third duty cycle of said current regulator to a second duty cycle setpoint greater than said first duty cycle setpoint and providing a second output signal which is in said first state when said third duty cycle is greater than said second duty cycle setpoint and in said second state otherwise;

(f) monitoring said second output signal to initiate a second tap change output signal when said second output signal has been in said first state for a second predetermined time interval; and (g) decreasing the turns ratio of the transformer responsive to said second tap-change output signal.

5. The method of claim 4, wherein the step of increasing the turns ratio includes the step of electrically removing secondary windings from said transformer, and wherein the step of decreasing the turns ratio includes the step of electrically adding secondary windings to said transformer.

6. The method of claim 4, wherein the step of increasing the turns ratio includes the step of electrically adding primary windings to said transformer, and wherein the step of decreasing the turns ratio includes the step of electrically removing primary windings from said transformer.

7. The method of claim 4, further comprising the step of:
(h) reducing the duty cycle of said current regulator to a fourth duty cycle smaller than said second duty cycle setpoint.

8. The method of claim 7, wherein the step of comparing the third duty cycle to the second duty cycle setpoint includes the step of comparing the third duty cycle to a duty cycle of 100%.

9. The method of claim 4, wherein current is applied to the transformer and the method further includes the step of switching off the current before the steps of increasing and decreasing the turns ratio.

10. The method of claim 9, wherein the step of switching off the current includes the step of switching off the current for no more than 5 cycles of the current.

11. The method of claim 10, wherein the step of switching off the current includes the step of switching off the current for no more than 2 cycles of the current.

12. An apparatus for use in a transformer having multiple taps, the apparatus for switching the taps of the multiple-tap transformer, the transformer having primary windings connected to a power supply and a secondary windings connected to a load circuit, the apparatus comprising:
(a) a load regulator capable of generating a desired duty cycle signal; and
(b) an inductance controller, said inductance controller further comprising,
 (i) a first reference signal generator configured to generate a first reference signal indicative of a first reference duty cycle;
 (ii) a comparator connected to the load regulator and responsive to the desired duty cycle signal, and connected to said first reference signal generator to compare the desired duty cycle signal to the first reference signal and to generate a first output signal which is in a first state when the first reference duty cycle differs from the desired duty cycle signal in a first sense and is in a second state otherwise;
 (iii) a timer coupled to receive the first output signal for initiating a first relay change after the first output signal has been in the first state for a first predetermined time interval; and
 (iv) a first and second relay connected to transformer taps and responsive to the first relay change signal.

13. The apparatus of claim 12 wherein said load regulator comprises:
(i) a load sensor configured to sense a first load parameter in the load circuit and to generate a first load signal indicative of said first load parameter;
(ii) an electrical switch controller connected to the load sensor and responsive to the first load signal to generate the desired duty cycle signal in response to said first load signal; and
(iii) an electrical switch connected to the primary windings and responsive to the desired duty cycle signal to regulate the flow of current from the power supply to the primary windings.

14. The apparatus of claim 13, wherein the load sensor is responsive to current in the load circuit.

15. The apparatus of claim 13, wherein the first and second relays are connected to transformer taps on the secondary side of the transformer.

16. The apparatus of claim 13 wherein the load regulator further comprises a brightness switch for changing a load current setpoint, and wherein the inductance controller further comprises a step change time limit circuit responsive to the brightness switch and capable of limiting the time permitting the energizing or deenergizing of the first or second relays for a predetermined time interval.

17. The apparatus of claim 13, wherein the electrical switch is a solid state device.

18. The apparatus of claim 17, wherein the solid state device is one of the group consisting of an IGBT, a TRIAC, a bipolar transistor, and an SCR.

19. The apparatus of claim 13 wherein the inductance controller further comprises,
(v) an inhibit regulator output circuit responsive to said first relay change signal and capable of signaling said load regulator to inhibit all current flow through the electrical switch; and
(vi) a relay delay circuit responsive to said first relay change signal and capable of delaying the first relay change signal until said inhibit current regulator circuit has inhibited all current flow through the electrical switch.

20. The apparatus of claim 19, wherein the inductance controller further comprises,
(vii) a relay failure detection circuit capable of sensing the failure of the first and second relay comprising,
 (a) an electrical emissions sensor responsive to electrical emissions from the first and second relays; and
 (b) a regulator suppression circuit responsive to the emissions sensor and capable of signaling said load regulator to inhibit all current flow through the electrical switch.

21. The apparatus of claim 19, wherein current is applied to the transformer and the inhibit regulator output circuit inhibits flow of the current for an interval of no more than 5 cycles of the current.

22. The apparatus of claim 21, wherein the inhibit regulator output circuit inhibits flow of the current for an interval of no more than 2 cycles of the current.

23. The apparatus of claim 19, wherein the relay delay circuit delays the first relay change signal for no more than 50 milliseconds.

24. The apparatus of claim 23, wherein the relay delay circuit delays the first relay change signal for no more than 30 milliseconds.

25. The apparatus of claim 24, wherein the relay delay circuit delays the signal for about 20 milliseconds.

26. The apparatus of claim 19, wherein the transformer has at least a first and second tap on the secondary windings connected to said first and second relays, respectively, and wherein the output voltage of the transformer at the second tap is no more than 25% greater than the output voltage at the first tap.

27. The apparatus of claim 26, wherein the output voltage at the second tap is no more than 15% greater than the output voltage at the first tap.

28. The apparatus of claim 27, wherein the output voltage at the second tap is no more than 10% greater than the output voltage at the first tap.

* * * * *